(12) United States Patent
Hong et al.

(10) Patent No.: US 9,928,077 B2
(45) Date of Patent: Mar. 27, 2018

(54) CHIP STARTING METHOD, MULTI-CORE PROCESSOR CHIP AND STORAGE MEDIUM

(71) Applicant: SANECHIPS TECHNOLOGY CO., LTD., Shenzhen, Guangdong (CN)

(72) Inventors: Sihua Hong, Shenzhen (CN); Baling Wang, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 82 days.

(21) Appl. No.: 15/108,351

(22) PCT Filed: Apr. 14, 2014

(86) PCT No.: PCT/CN2014/075294
§ 371 (c)(1),
(2) Date: Jun. 27, 2016

(87) PCT Pub. No.: WO2015/100878
PCT Pub. Date: Jul. 9, 2015

(65) Prior Publication Data
US 2016/0321082 A1 Nov. 3, 2016

(30) Foreign Application Priority Data
Dec. 30, 2013 (CN) .......................... 2013 1 0749809

(51) Int. Cl.
*G06F 13/36* (2006.01)
*G06F 11/00* (2006.01)
(Continued)

(52) U.S. Cl.
CPC .......... *G06F 9/4401* (2013.01); *G06F 9/4405* (2013.01); *G06F 13/30* (2013.01); *G06F 2213/0038* (2013.01)

(58) Field of Classification Search
None
See application file for complete search history.

(56) References Cited

U.S. PATENT DOCUMENTS

| 5,283,868 A | 2/1994 | Baker |
| 5,325,517 A | 6/1994 | Baker |

(Continued)

FOREIGN PATENT DOCUMENTS

| CN | 1168004 C | 9/2004 |
| CN | 1728113 A | 2/2006 |

(Continued)

OTHER PUBLICATIONS

International Search Report in international application No. PCT/CN2014/075294, dated Sep. 28, 2014, 6 pgs.

(Continued)

*Primary Examiner* — Hyun Nam
(74) *Attorney, Agent, or Firm* — Cooper Legal Group, LLC

(57) ABSTRACT

A chip starting method, a multi-core processor chip and a storage medium. The chip starting method comprises: setting a first starting priority for more than two processors, and separately setting, for each processor, a second priority of starting each storage unit in more than two storage units; determining, according to the first priority, a first processor that is to be started and has the highest priority; the first processor successively loading a start program from each storage unit according to the second priority corresponding to the first processor, and executing the start program to perform an initialization operation; ending program loading of the first processor when loading of the start program from any storage unit in the more than two storage units succeeds, or loading of the start program from all storage units in the more than two storage units fails; and starting program loading of the second processor and so on until program loading of the more than two processors is completed.

20 Claims, 5 Drawing Sheets

(51) Int. Cl.
*G06F 9/44* (2018.01)
*G06F 13/30* (2006.01)

(56) References Cited

U.S. PATENT DOCUMENTS

| | | | |
|---|---|---|---|
| 7,711,941 B2 | 5/2010 | Henry | |
| 2006/0026359 A1 | 2/2006 | Ross | |
| 2008/0148034 A1* | 6/2008 | Henry | G06F 9/4401 713/1 |
| 2010/0205484 A1* | 8/2010 | Dragicevic | G06F 11/3636 714/37 |
| 2011/0010510 A1 | 1/2011 | Pan | |
| 2011/0302399 A1 | 12/2011 | Dubinsky | |
| 2011/0320794 A1 | 12/2011 | Yang | |
| 2015/0106822 A1* | 4/2015 | Lei | G06F 9/5005 718/104 |
| 2016/0274996 A1* | 9/2016 | Chen | G06F 11/3632 |

FOREIGN PATENT DOCUMENTS

| | | |
|---|---|---|
| CN | 101751273 A | 6/2010 |
| CN | 102707975 A | 10/2012 |
| CN | 102722394 A | 10/2012 |
| CN | 102902556 A | 1/2013 |
| CN | 103019775 A | 4/2013 |
| CN | 103207788 A | 7/2013 |
| CN | 103294511 A | 9/2013 |
| WO | 0127753 A2 | 4/2001 |
| WO | 2011159263 A1 | 12/2011 |

OTHER PUBLICATIONS

English Translation of the Written Opinion of the International Search Authority in international application No. PCT/CN2014/075294, dated Sep. 28, 2014, 9 pgs.
Supplementary European Search Report in European application No. 14877078.7, dated Jan. 3, 2017, 6 pgs.

* cited by examiner

CHIP STARTING METHOD, MULTI-CORE PROCESSOR CHIP AND STORAGE MEDIUM

TECHNICAL FIELD

The disclosure relates to the technology of integrated circuit chip design, and in particular to a chip starting method, a multi-core processor chip, and a storage medium.

BACKGROUND

Designing the start of a chip is always one of the keys of designing the chip. A large part of the reason why many devices are failed and discarded is that the failure of start of a chip causes the chip failure and finally causes of discarding of the whole device. When a chip is starting, implementation of some initialization operations and configuration managements is required in the chip. When the chip is in a small scale, the initialization and configuration of the chip is directly included in a clock reset design of the chip. The process of clock reset operation is completed while the chip is powered on, that is, the chip starting process is completed. After the clock reset is completed, the chip can operate normally.

Then, the chip scale is extended, for example, processors are added. Configuration information about the start of the chip is usually stored on an on-chip Read Only Memory (ROM); when the chip is starting, the configuration information on the ROM is called to perform initial configuration to the chip.

With the increasing extension of the chip scale and the diversification of application scenarios of the chip, the chip has more and more contents to be initialized, and the initialized contents require to be updated, so many chips store start programs in an ROM+flash mode or a direct flash mode. In this two modes, high-volume initialization programs which can be upgraded are stored in the flash.

Later, upgrading has some difficulties in the flash mode, so a series of solutions are provided in the related art to improve the robustness and convenience of upgrading the initialization programs. The current optimizing solutions for the start of chip still focus on the optimization of software, such as jump and data backup, but rarely involve the structure of hardware, let alone the current multi-core and multi-channel chip. The widely used multi-core and multi-channel chip has a very strict requirement for channel quality in the start process, if a flash channel has problems, the start of the chip will inevitably fail, which causes the failure of the whole chip.

SUMMARY

In view of the above, to solve the problems in the prior art, embodiments of the disclosure provide a chip starting method, a multi-core processor chip and a storage medium, which can perform a structural optimization on a multi-core and multi-channel chip, thereby improving the robustness and performance of the chip.

Technical solutions of the embodiments of the disclosure are implemented as follows.

A chip starting method is provided, which is for use in a multi-core processor chip; the multi-core processor at least includes more than two processors and more than two storage units; the method includes: a first priority queue of starting more than two processors is set, and a second priority queue of starting each of the more than two storage units is set for each processor; the method further includes that:

a first processor which is to be started and has a highest priority is determined according to the first priority queue;

the first processor successively loads a start program from each storage unit according to the second priority queue corresponding to the first processor, and executes the start program to perform an initialization operation;

the program loading of the first processor ends when the loading of the start program from any one of the more than two storage units succeeds, or the loading of the start program from all of the more than two storage units fails; and the program loading of the second processor is started until the program loading of the more than two processors is completed.

In an embodiment, the multi-core processor chip may further include a boot controller, and the method may further include:

the first processor reports a start success message to the boot controller when the loading of the start program from any one of the more than two storage units succeeds; and correspondingly, the step that the program loading of the second processor is started includes:

the boot controller determines the second processor which is to be started and has a second highest priority according to the first priority queue when the message about successful start which is reported by the first processor is received or it is determined that the first processor fails to load the start program from a storage unit with the lowest priority in the second priority queue corresponding to the first processor.

In an embodiment, the multi-core processor chip may further include a boot controller;

herein, the step that the first processor which is to be started and has the highest priority is determined according to the first priority queue may include:

the boot controller determines the first processor according to the first priority queue, and determines, for the first processor, a current storage unit from where the start program is to be loaded according to the second priority queue corresponding to the first processor; and the step that the first processor successively loads the start program from each storage unit according to the second priority queue corresponding to the first processor and executes the start program to perform the initialization operation may include steps as follows:

the first processor loads the start program from the current storage unit;

upon determination that the loading succeeds, the first processor executes the start program to perform the initialization operation;

upon determination that the loading fails, the boot controller determines for the first processor a next storage unit as the current storage unit from where the start program is to be loaded according to the second priority queue corresponding to the first processor; and the steps of loading, executing and determining are repeated until the first processor loads the start program from the storage unit with the lowest priority in the second priority queue corresponding to the first processor.

In an embodiment, the determination that the loading fails may include:

when the start program is loaded from the current storage unit, the first processor reports a start beginning message to the boot controller;

time elapsed from reception of the start beginning message is measured; if the start success message which is sent by the first processor is not received when a timing threshold is exceeded, it is determined that the first processor fails to load the start program from the current storage unit.

In an embodiment, the method may further include:

a processor which adjusts the frequency of a system clock fastest is determined as the first processor with the highest priority.

In an embodiment, the multi-core processor chip may further include a Direct Memory Access (DMA) unit and an on-chip storage unit, and the method may further include:

when the first processor succeeds in loading the start program and executes the start program to perform the initialization operation, the DMA unit moves the start programs of other processors whose priorities are lower than that of the first processor to the on-chip storage unit according to the first priority queue.

In an embodiment, when the multi-core processor chip adopts an ROM storage unit and a storage unit of a flash channel, a first storage unit of the first processor may include the ROM storage unit and the storage unit of the flash channel;

the step that the start program is executed to perform the initialization operation may include:

the first processor reads a first part of the start program from the ROM storage unit and executes the first part of the start program, and reads, according to a jump instruction at the end of the first part of start program, a second part of the start program from the storage unit of the flash channel and executes the second part of the start program.

In an embodiment, when the multi-core processor chip may include a Micro Control Unit (MCU), a Central Processor Unit (CPU) and a Digital Signal Processor (DSP), they are ranked in a descending order of priority in the first priority queue as: the MCU, the CPU and the DSP.

A multi-core processor chip is provided, which includes at least: a boot controller, more than two processors and more than two storage units; the boot controller is communicatively connected with each processor, and the more than two processors are connected in sequence according to a set order of a first priority queue;

the boot controller is configured to determine a current processor according to the first priority queue of starting the more than two processors, and determine, for the current processor, current storage units from where a start program is to be loaded according to the second priority queue corresponding to the current processor;

the current processor is configured to load the start program from each current storage unit according to the second priority queue corresponding to the current processor and execute the start program to perform the initialization operation; the current processor is further configured to exit the loading of the start program when the loading of the start program from any one of the more than two storage units succeeds, or the loading of the start program from all of the more than two storage units fails.

In an embodiment, the multi-core processor chip may further include a DMA unit;

the DMA unit is configured to, when the current processor succeeds in loading the start program and executes the start program to perform the initialization operation, move start programs of other processors whose priorities are lower than that of the current processor to the on-chip storage unit according to the first priority queue.

A computer storage medium is provided, which stores therein a computer-executable instruction for performing the aforementioned chip starting method.

In the embodiment of the disclosure, the first priority queue is set for more than two processors, and the second priority queue of starting each of more than two storage units is set for each processor; the first processor that is to be started and has the highest priority is determined according to the first priority queue; the first processor successively loads the start program from each storage unit according to the second priority queue corresponding to the first processor, and executes the start program to perform the initialization operation; the program loading of the first processor ends when the loading of the start program from any one of the more than two storage units succeeds, or the loading of the start program from all of the more than two storage units fails; and the program loading of the second processor is started until the program loading of the more than two processors is completed; in this way, a structural optimization can be performed on the multi-core and multi-channel chip, thereby improving the robustness and performance of the chip.

DETAILED DESCRIPTION

The technical solutions of the disclosure are elaborated below in combination with the accompanying drawings and specific embodiments.

Embodiment 1

Figure 1:
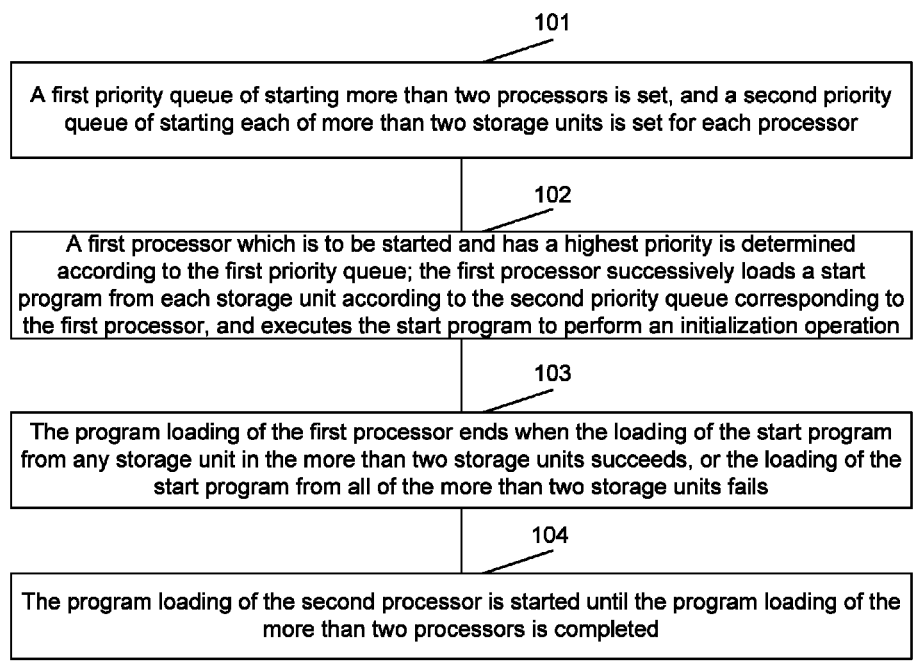
FIG. 1 is a flowchart of a chip starting method according to an embodiment of the disclosure.

A chip starting method which is provided by an embodiment of the disclosure is for use in a multi-core processor chip, herein the multi-core processor chip at least includes more than two processors and more than two storage units. FIG. 1 is a flowchart of a chip starting method according to an embodiment of the disclosure; as shown in FIG. 1, the chip starting method includes the following steps:

Step 101: a first priority queue of starting the more than two processors is set, and a second priority queue of starting each of the more than two storage units is set for each processor;

Step 102: a first processor which is to be started and has a highest priority is determined according to the first priority queue; the first processor successively loads a start program from each storage unit according to the second priority queue corresponding to the first processor, and executes the start program to perform an initialization operation;

Step 103: the program loading of the first processor ends when the loading of the start program from any storage unit in the more than two storage units succeeds, or the loading of the start program from all of the more than two storage units fails; and Step 104: the program loading of the second processor is started until the program loading of the more than two processors is completed.

In the embodiment of the disclosure, there are many types of internal cores of the existing multi-core processor chip, especially a multi-core processor baseband chip, mainly including: a computation-intensive DSP, and a control-intensive CPU and a simple scheduling configuration MCU. The required number of each type of processors is different according to the different requirements of application scenarios. At the same time, because of the diversity of application scenarios of the multi-core processor chip, there is a rich diversity of channels for the chip to communicate with outside, including a flash channel, a Serial Rapid Input Output (SRIO) channel, a Serial Gigabit Media Independent Interface (SGMII) channel, a Universal Serial Bus (USB) channel, a General Purpose Input Output (GPIO) channel, and so on.

When the multi-core processor chip includes any two or three of the DSP, CPU, and MCU, the MCU may have the highest priority in the first priority queue, the CPU has the second highest priority, and the DSP has the third highest priority; the reason why the MCU is selected as the first processor is that the MCU can change the dominant frequency of a system to enable the system to enter into a high-speed processing state in the shortest time so that time taken for other processors to start is reduced.

In the embodiment of the disclosure, the storage units include ROM storage units in the chip, and external channel(s). When the second priority queue is set, the ROM storage units have the highest priority; when the multi-core processor chip communicates with outside through the flash channel, the SRIO channel, the SGMII channel, the USB channel and the GPIO channel, they can be set in a descending order of priority in the second priority queue as: flash channel, the USB channel, the SGMII channel, the SRIO channel, and the GPIO channel.

In the embodiment of the disclosure, the method further includes: the first processor reports a start success message to a boot controller when the loading of the start program from any one of the more than two storage units succeeds;

correspondingly, the step that the program loading of the second processor is started includes:

the boot controller determines the second processor which is to be started and has a second highest priority according to the first priority queue when the start success message which is reported by the first processor is received or it is determined that the first processor fails to load the start program from the storage unit with a lowest priority in the second priority queue corresponding to the first processor.

In the embodiment of the disclosure, the multi-core processor chip also includes a DMA unit and an on-chip storage unit. The method further includes: when the first processor succeeds in loading the start program and executes the start program to perform the initialization operation, the DMA moves start programs of other processors whose priorities are lower than that of the first processor to the on-chip storage unit according to the first priority queue In the embodiment of the disclosure, when the multi-core processor chip adopts an ROM storage unit and a storage unit of a flash channel, the first storage unit of the first processor includes the ROM storage unit and the storage unit of the flash channel; the step that the start program is executed to perform the initialization operation includes: the first processor reads a first part of start program from the storage unit ROM and executes the first part of the start program, and reads, according to a jump instruction at the end of the first part of the start program, a second part of the start program from the storage unit of the flash channel and executes the second part of the start program.

By combining features of the processors in the multi-core processor chip and the diversity of interfaces for the chip to communicate with outside, a chip starting method provided by the embodiment of the disclosure ensures the robustness of starting the chip, reduces the offline probability of a wireless network, and improves the communication safety quality by monitoring and scheduling the start.

Embodiment 2

Figure 2:
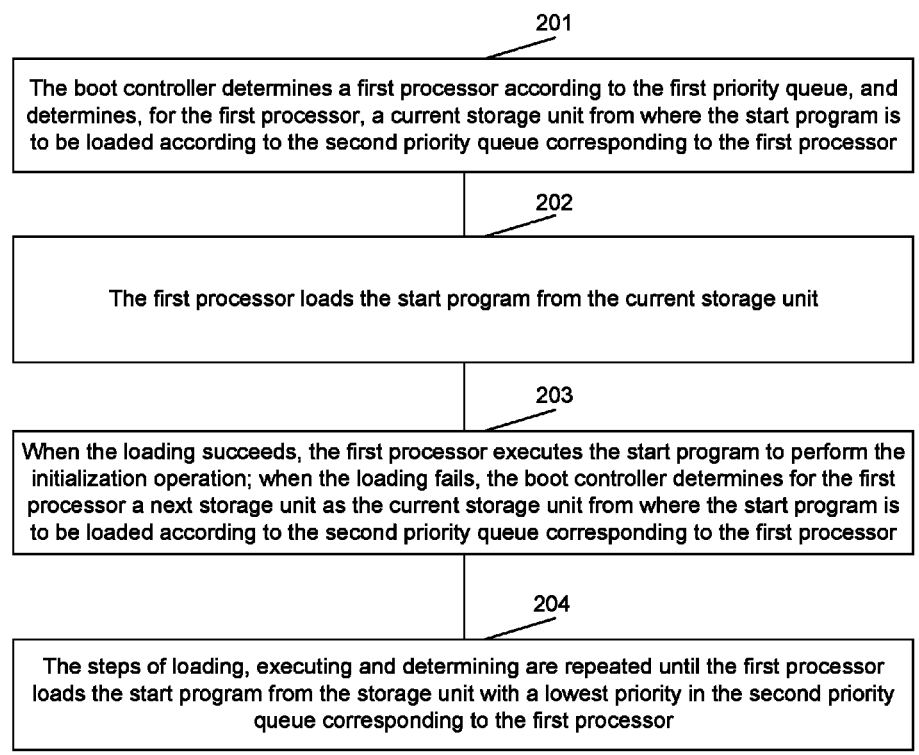
FIG. 2 is a flowchart of Step 101 in a first embodiment of the disclosure.

Based on the chip starting method provided by the embodiment 1 of the disclosure, in the present embodiment of the disclosure, the multi-core processor chip also includes a boot controller. FIG. 2 is a flowchart of Step 101 in the embodiment 1 of the disclosure; as shown in FIG. 2, Step 101 includes the following steps:

Step 201: the boot controller determines the first processor according to the first priority queue, and determines, for the first processor, a current storage unit from where the start program is to be loaded according to the second priority queue corresponding to the first processor;

Step 202: the first processor loads the start program from the current storage unit;

Step 203: upon determination that the loading succeeds, the first processor executes the start program to perform the initialization operation; upon determination that the loading fails, the boot controller determines for the first processor a next storage unit as the current storage unit from where the start program is to be loaded according to the second priority queue corresponding to the first processor; and Step 204: the steps of loading, executing and determining are repeated until the first processor loads the start program from the storage unit with a lowest priority in the second priority queue corresponding to the first processor.

In the embodiment of the disclosure, the boot controller can determine that the loading fails according to a message about the failure of loading which is sent by the first processor. In this mode, because the processor may be in an uncontrollable state when the loading fails, the boot controller may be unlikely to determine that the first processor fails to load due to the possibility of not receiving the message about the failure of loading.

In the embodiment of the disclosure, the determination that the loading fails can be implemented by the following steps:

when the start program is loaded from the current storage unit, the first processor reports a start beginning message to the boot controller;

time elapsed from reception of the start beginning message is measured; if the start success message which is sent by the first processor is not received when a timing threshold is exceeded, it is determined that the first processor fails to load the start program from the current storage unit.

This mode can avoid the case in the previous mode that it is impossible to determine that the first processor fails to load due to not reception of the message about the failure of loading, thereby improving the accuracy.

In the embodiment of the disclosure, there can be one or more processors of the same type, depending on the different application scenarios; when there are several processors of the same type, e.g. the CPU, in the chip, it is also needed to set the priority order for these CPUs.

Embodiment 3

Based on the embodiments 1 and 2, an embodiment of the disclosure further provides a multi-core processor chip, which includes at least a boot controller, more than two processors, and more than two storage units; specifically, the boot controller is communicatively connected with each processor; the more than two processors are connected in sequence according to the set order of the first priority queue;

the boot controller is configured to determine a current processor according to the first priority queue of starting the more than two processors, and determine, for the current processor, current storage units from where a start program is to be loaded according to the second priority queue corresponding to the current processor;

the current processor is configured to load the start program from each current storage unit according to the second priority queue corresponding to the current processor and execute the start program to perform the initialization operation; the current processor is further configured to exit the loading of the start program when the loading of the start program from any one of the more than two storage units succeeds, or the loading of the start program from all of the more than two storage units fails.

In the embodiment of the disclosure, the multi-core processor chip further includes a DMA unit; the DMA unit is configured to, when the current processor succeeds in loading the start program and executes the start program to perform the initialization operation, move start programs of other processors whose priorities are lower than that of the current processor to the on-chip storage unit according to the first priority queue.

Embodiment 4

Figure 3:
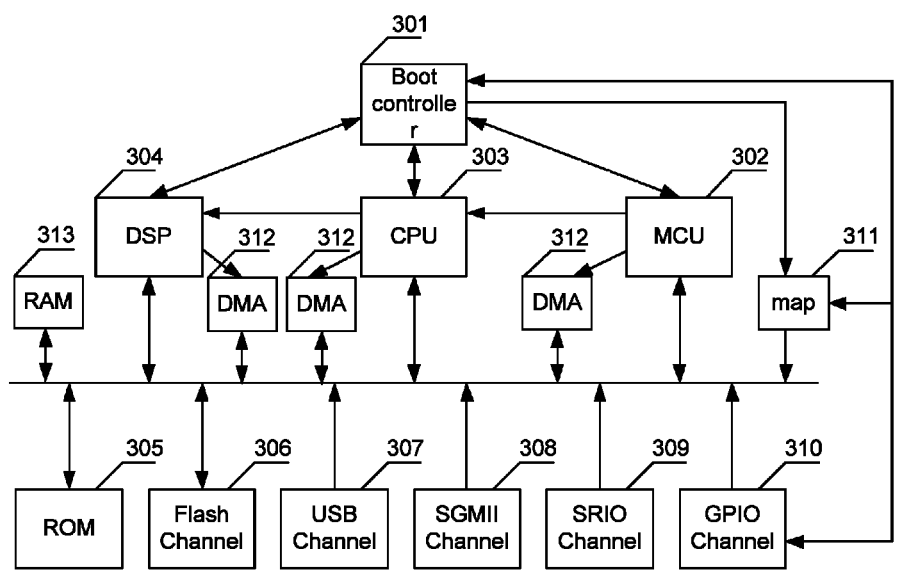
FIG. 3 is a structure diagram of a multi-core processor chip according to a fourth embodiment of the disclosure.

Based on the embodiment 3, FIG. 3 is a structure diagram of a multi-core processor chip according to the embodiment 4 of the disclosure; as shown in FIG. 3, the multi-core processor chip adopts a bus structure. The chip includes a boot controller 301, and the boot controller is connected with three types of processors, namely, a CPU 303, an MCU 302 and a DSP 304. For describing clearly, there is only one processor of the same type; the three processors are connected in sequence according to the set order of the first priority queue, and each processor is connected with a DMA unit 312 for start. Except the internal ROM 305 and internal Random-Access Memory (RAM) 313, the chip also includes channels for communicating with outside, including a flash channel 306, a USB channel 307, an SGMII channel 308, an SRIO channel 309 and a GPIO channel 310;

the boot controller 301 is configured to monitor the start process of each processor. A corresponding timer and timing threshold are set for each processor. When the corresponding processor starts performing a start operation, the timer begins to measure time elapsed thereafter; if the corresponding processor does not feed back information about the success of start to the boot controller when the timing value reaches the corresponding timing threshold, the boot controller determines that the processor fails to start; then, it is possible to perform a resetting start on all processors and perform address mapping configuration on a bus channel.

The MCU 302 can schedule some tasks with low computation complexity and control complexity. In the present embodiment, the MCU 302 is started as the first processor. The CPU 303 can perform some universal operations and complex control thereof. The priority of the CPU 303 is lower than that of the MCU 402. The DSP 304 can process some computation-intensive special operation programs. The priority of the DSP 304 is lower than that of the CPU 303.

The ROM storage unit 305 is configured to store a first part of the start program for the first processor to perform basic configuration at the moment of start; the storage unit of the flash channel 306 is configured to store a second part of the start program of the first processor, all start programs of other processors, system software, application software, and other programs and data. The storage unit of the USB channel 307 is configured to store backup start programs of all the core processors for upgrading programs. The SGMII channel 308 is configured to connect with a main control unit of the system and its core network to perform data communication until the system starts online. The SRIO channel 309 is configured to perform interactive communication with other chips and support start of the chip through other chips. The GPIO channel 310 can support start of the chip from outside and is configured to communicate with outside at a low speed.

A channel mapping management unit (map) 311 is configured to manage channel switching, and change channel connection according to the first priority queue and the second priority queue set by the boot controller 301 to make the corresponding processor start on the specified channel. The DMA unit 312 is configured to move data and programs and can improve the program loading speed in the process of system startup. The RAM 313 is configured to store the start program loaded from outside; a piece of software can read the start program from the RAM directly.

Embodiment 5

Based on the embodiments from 1 to 4, the method for starting the multi-core processor chip provided by the present embodiment of the disclosure is elaborated by taking, as an example, a multi-core processor chip including an MCU, a CPU and a DSP, in which except an internal ROM, the chip communicates with outside through a flash channel, an SRIO channel, an SGMII channel, a USB channel and a GPIO channel; and the method includes the following steps.

Step A1: the multi-core processors in the chip are classified; the first priority queue of starting the three types of processors is set, and the second priority queue of corresponding storage units is set for each processor;

in this step, because the MCU can change the dominant frequency of the system to enable the system to enter into the high-speed processing state in the shortest time so that the starting time of other processors is reduced, the MCU is selected as the first processor; the highest priority is set for the MCU. So, the order of the first priority queue is the MCU, the CPU, and the DSP.

When the MCU is regarded as the first processor, the system stays at a high frequency for a long time in the startup process. After the start program loading of the MCU is completed, the system clock can increase from 100 MHz to 600 MHz, and the loading speed of the system startup can have a six-fold increase.

In this step, the chip communicates with outside through the flash channel, the SRIO channel, the SGMII channel, the USB channel, and the GPIO channel; for describing conveniently, the same second priority queue is set for each type of processors; the specific second priority queue with a descending order of priority is: the flash channel, the USB channel, the SGMII channel, the SRIO channel, and the GPIO channel.

Step A2: the boot controller determines the first processor according to the first priority queue, and determines the first storage unit for the current processor according to the second priority queue; the first storage unit of the first processor includes an ROM storage unit and a storage unit of a flash channel.

In the process of normal start, the first processor reads a part of start program from the internal ROM, and executes the first part of start program to perform the initialization operation. When executing the first part of start program, the first processor adjusts the frequency of the system clock to make the system enter into a high-frequency state. There is a jump instruction at the end of the first part of start program, so the first processor loads a second part of start program from a flash interface according to the jump instruction.

when executing the first part of start program or the second part of start program to perform the initialization operation, the first processor can start the DMA unit to move start programs of other off-chip cores to the on-chip storage unit, i.e., RAM, so that the time taken for program loading can be reduced during the start of other cores, and on-chip read-write configuration can be performed directly.

Step A3: the DMA unit moves the programs continuously, at the same time, other processors perform a start configuration. Finally, the DMA unit moves all the programs, and other processors complete the start configuration; in this way, the chip completes an entire set of start operations in a normal flow.

Step A4: the boot controller monitors the start flow in the process of start; each processor needs to report a start state message to the controller at the beginning of start and after the start succeeds. If the controller finds that the start fails, the controller switches a start channel of the corresponding core.

Herein, the start state message includes a loading beginning message which indicates that the processor begins loading the start program, a start success message which indicates that the processor succeeds in starting, and a loading failure message which indicates that the processor fails to load the start program.

When the loading succeeds, the current processor executes the start program to perform the initialization operation, and reports the start success message to the boot controller;

when the loading fails, the boot controller determines for the current processor a next storage unit as the current storage unit according to the second priority queue, and reports a start failure message to the boot controller when the current processor fails to load the last storage unit.

Step A5: when the current processor fails to start for the first time, the boot controller switches the start channel through the map, and an initial start address is switched from the ROM to a corresponding address on the flash channel.

If the current processor fails to start for the second time, the boot controller switches the start channel through the map, and the initial start address is switched from the corresponding address on the flash channel to an address on the USB channel.

If the current processor fails to start for the third time, the boot controller switches the start channel through the map, and the initial start address is switched from the corresponding address on the USB channel to an address on the SGMII channel.

If the current processor fails to start for the fourth time, the boot controller switches the start channel through the map, and the initial start address is switched from the corresponding address on the SGMII channel to an address on the SRIO channel.

If the current processor fails to start for the fifth time, the boot controller switches the start channel through the map, and the initial start address is switched from the corresponding address on the SRIO channel to an address on the GPIO channel.

Herein, the GPIO channel uses a pin multiplexing mode. Before starting from the GPIO channel, the boot controller redefines pins, that is, the boot controller defines a part of pins used when the system is in normal operation as start pins, and the start program is loaded through this part of pins. After the start succeeds, the boot controller releases this part of pins. The present embodiment saves pin resources by multiplexing the pins of the GPIO channel, and then reduces the cost of the chip.

Step A6: if the boot controller still cannot receive the start success message after all the channels of the current processor are polled once, the controller selects, according to the priorities of cores, a core with the highest priority from the rest cores as the new current core; go to Step A2 to perform a new normal start.

Step A7: if none of the processors of the system succeeds in starting after all the cores are polled once, the multi-core processor chip will be discarded and will not be reused. The chip can enter into a working state, provided there is a processor which can operate normally, and the other processors which fail to start normally can start again by applying patches, updating online and other ways as long as there is no hardware problem.

In the present embodiment, the steps from A1 to A7 can be performed in any order.

Embodiment 6

Figure 4:
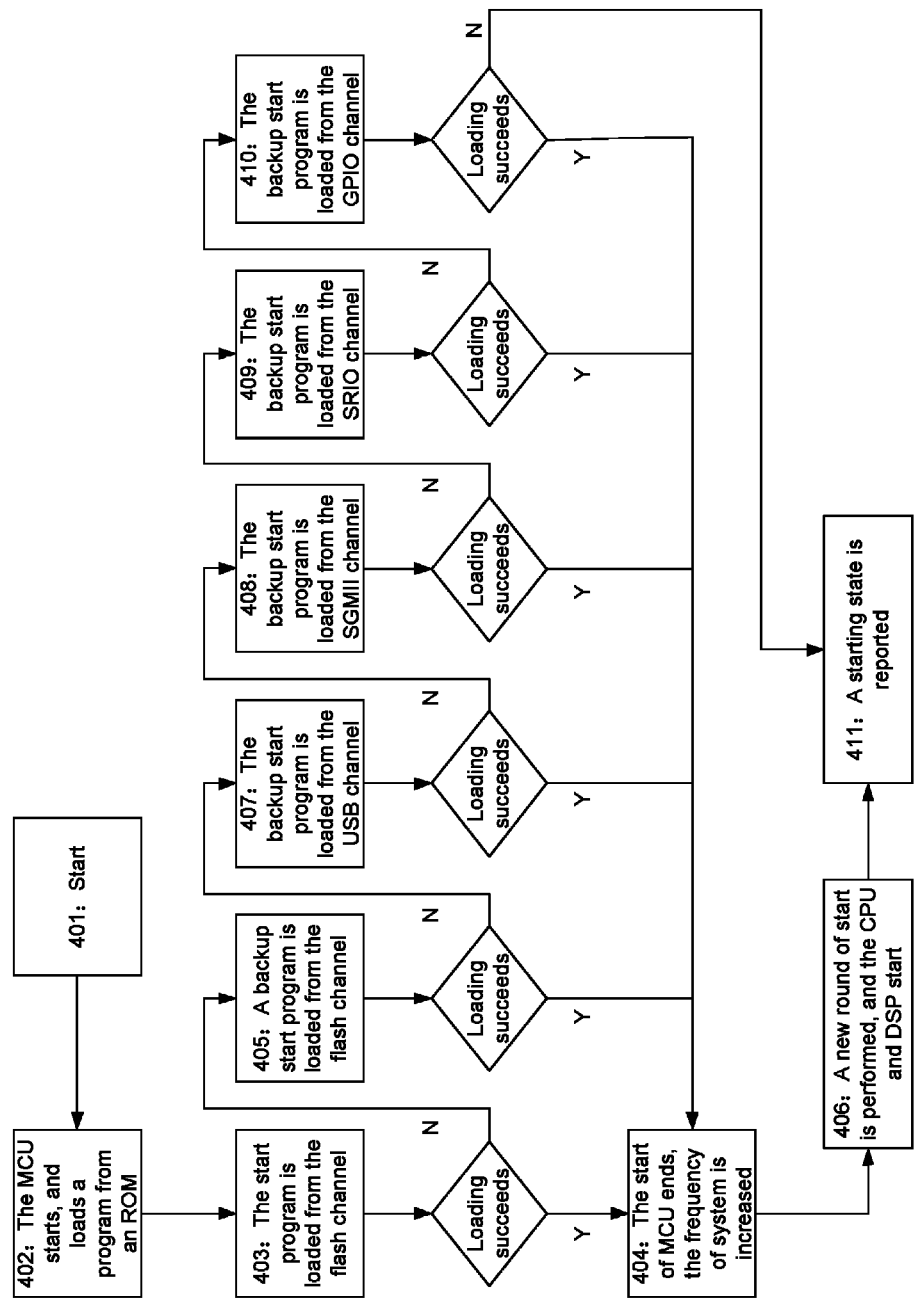
FIG. 4 is a flowchart of starting a multi-core processor chip according to an embodiment of the disclosure.

Based on the embodiment 4, FIG. 4 is a flowchart showing that a multi-core processor chip starts according to an embodiment of the disclosure; as shown in FIG. 4, the flowchart shows processing procedures when the chip starts normally according to the starting flow of the chip and jump processing procedures in abnormal cases. The flow includes the following steps.

Step 401: when a system chip is powered on or reset externally, a boot controller determines a first processor according to the first priority queue, herein the first processor is regarded as a current processor, and determines a first storage unit for the current processor according to a second priority queue, wherein the first storage unit is regarded as the current storage unit.

Step 402: the current processor reads a first part of start program from an on-chip ROM and performs an initial configuration.

Step 403: after performing the configuration of the first part of start program, the current processor jumps to a first address flash_address1 of a flash channel to load a second part of start program; when the loading succeeds, go to Step 404; or else, go to Step 405.

Step 404: the current processor determines whether the dominant frequency of the system has increased; if not, configuration is performed to increase the dominant frequency of the system; if the boot controller receives the start success message within the specified time, go to Step 406.

Step 405: the current processor jumps, according to the indication of the boot controller, to a second address flash_address2 of the flash channel to load a backup start program; if the loading succeeds, the start success message is reported to the boot controller, and go to Step 406; or else, the loading failure message is reported to the boot controller, and then the boot controller performs the address mapping configuration to enable the current processor to start from the USB channel.

Step 406: the boot controller selects a core with the highest priority from the cores which have not started as the current processor, and the core performs a new round of start; Step 405 and Step 407 to 410 are performed, and Step 411 is performed finally.

Step 407: the current processor loads the start program from the USB channel; if the start succeeds, the start success message is reported to the boot controller, and Step 406 is performed; or else, the loading failure message is reported to the boot controller, and then the boot controller performs the address mapping configuration to enable the current processor to start from the SGMII channel.

Step 408: the current processor loads the start program from the SGMII channel; if the start succeeds, the start success message is reported to the boot controller, and Step 406 is performed; or else, the loading failure message is reported to the boot controller, and then the boot controller performs the address mapping configuration to enable the current processor to start from the SRIO channel.

Step 409: the current processor loads the start program from the SRIO channel; if the start succeeds, the start success message is reported to the boot controller, and Step 406 is performed; or else, the loading failure message is reported to the boot controller, and the boot controller performs the address mapping configuration to enable the current processor to start from the GPIO channel.

Step 410: the current processor loads the start program from the GPIO channel; if the start succeeds, the pins of the GPIO channel are released, at the same time, the start success message is reported to the boot controller, and Step 406 is performed; or else, the loading failure message is reported to the boot controller, and go to Step 406.

Step 411: after all the processors complete the start flow, the boot controller summarizes information of states about the start, and reports information of states about the successful or failed start to the outside. Now, the start flow ends.

Figure 5:
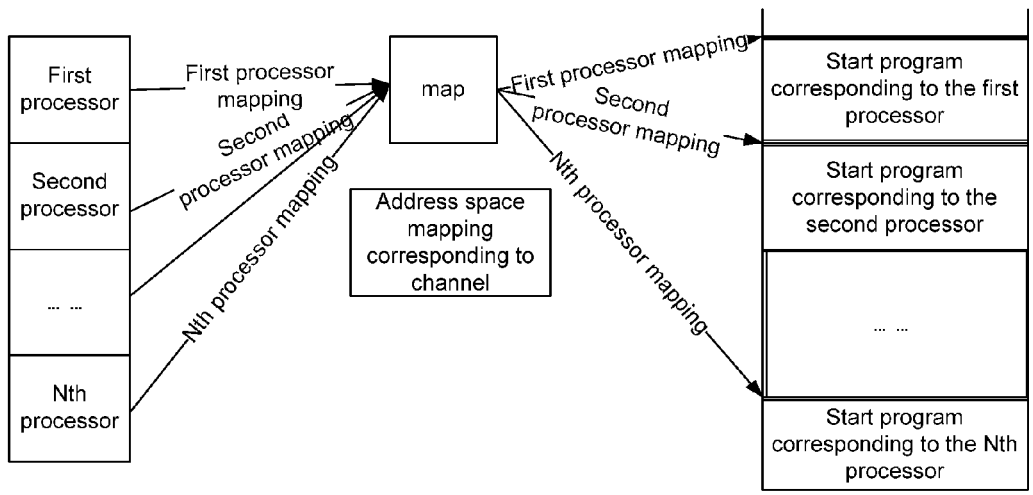
FIG. 5 is a schematic diagram of address mapping processes of different processors in a same channel according to an embodiment of the disclosure.

In the present embodiment, FIG. 5 is a schematic diagram of address mapping processes of different processors in the same channel according to an embodiment of the disclosure. As shown in FIG. 5, because the start programs in the same channel of the multi-core processors in the chip are stored at different addresses, the start addresses mapped by the channel mapping management unit are different. When the start programs are stored in an ROM+flash mode, for the first processor, there are two start addresses in the flash channel; the first start address corresponds to the second part of start program, and the second start address corresponds to the backup start program.

In the embodiment of the disclosure, the storage units include ROM storage units in the chip and external channel. When the second priority queue is set, the ROM storage unit has the highest priority; when the multi-core processor chip communicates with outside through the flash channel, the SRIO channel, the SGMII channel, the USB channel and the GPIO channel, the second priority queue can be set in a descending order of priority as: the flash channel, the USB channel, the SGMII channel, the SRIO channel, and the GPIO channel.

In the embodiment of the disclosure, if the chip starting method is implemented by software function modules, and the software function modules are sold or used as independent products, they can also be stored in a computer readable storage medium. Based on this understanding, the technical solutions in the embodiments of the disclosure substantially or the part making a contribution to the traditional art can be embodied in the form of software product; the computer software product is stored in a storage medium and includes a number of instructions to make a computer device (which can be a personal computer, a server or a network device, etc.) perform all or part of the method in each embodiment of the disclosure. The above storage medium includes: a USB flash disk, a mobile hard disk, an ROM, a magnetic disk or a compact disc, and other media which can store program codes. In this way, the disclosure is not limited to any particular combination of hardware and software.

Correspondingly, the embodiment of the disclosure also provides a computer storage medium, which stores a computer-executable instruction, wherein the computer-executable instruction is used for performing the chip starting method.

The above are only the preferred implementations of the disclosure and not intended to limit the scope of protection of the disclosure; any change or replacement that those skilled in the art can think of easily in the scope of technologies disclosed by the disclosure shall fall within the scope of protection of the disclosure. So, the scope of protection of the disclosure is subject to the scope of protection of the claims.

INDUSTRIAL APPLICABILITY

In the embodiments of the disclosure, a first priority queue is set for a multi-core processor chip, namely a chip including more than two processors; a certain processor is selected as the first-core processor of starting, and the priority of the first-core processor is set to the highest; then, a priority queue of starting each storage unit is set for each processor; in the process of start, the processors start in a descending order of priority, the start program is loaded from storage units according to a descending order of priority, and the start program is executed to perform the initialization operation; in this way, the structural optimization can be performed on the multi-core and multi-channel chip, thereby avoiding the failure of chip caused by the failure of start, and then improving the robustness and performance of the chip; further, applying these chips to devices can prevent the devices from being discarded because of the failure of start of the chips.

What is claimed is:

1. A chip starting method for use in a multi-core processor chip which at least comprises more than two processors and more than two storage units, comprising: setting a first priority queue of starting the more than two processors, and setting a second priority queue of starting each of the more than two storage units for each processor; and further comprising:
   determining, according to the first priority queue, a first processor which is to be started and has a highest priority;
   successively loading, by the first processor, a start program from each storage unit according to the second priority queue corresponding to the first processor, and executing the start program to perform an initialization operation;
   ending the program loading of the first processor when the loading of the start program from any one of the more than two storage units succeeds, or the loading of the start program from all of the more than two storage units fails; and
   starting the program loading of a second processor until the program loading of the more than two processors is completed.

2. The method according to claim 1, wherein the multi-core processor chip further comprises a boot controller, and the method further comprises:
 reporting, by the first processor, a start success message to the boot controller when the loading of the start program from any one of the more than two storage units succeeds; and
 wherein starting the program loading of the second processor comprises:
 determining, by the boot controller, the second processor which is to be started and has a second highest priority according to the first priority queue when the start success message which is reported by the first processor is received or it is determined that the first processor fails to load the start program from a storage unit with a lowest priority in the second priority queue corresponding to the first processor.

3. The method according to claim 1, wherein the multi-core processor chip further comprises a boot controller;
 wherein determining, according to the first priority queue, the first processor which is to be started and has the highest priority comprises:
 determining, by the boot controller, the first processor according to the first priority queue, and determining, for the first processor, a current storage unit from where the start program is to be loaded according to the second priority queue corresponding to the first processor; and
 wherein successively loading, by the first processor, the start program from each storage unit according to the second priority queue corresponding to the first processor and executing the start program to perform the initialization operation comprise steps of:
 loading, by the first processor, the start program from the current storage unit;
 upon determination that the loading succeeds, executing, by the first processor, the start program to perform the initialization operation;
 upon determination that the loading fails, determining, by the boot controller, for the first processor a next storage unit as the current storage unit from where the start program is to be loaded according to the second priority queue corresponding to the first processor; and
 repeating the steps of loading, executing and determining until the first processor loads the start program from a storage unit with a lowest priority in the second priority queue corresponding to the first processor.

4. The method according to claim 3, wherein the determination that the loading fails comprises:
 when the start program is loaded from the current storage unit, reporting, by the first processor, a start beginning message to the boot controller;
 measuring time elapsed from reception of the start beginning message; if the start success message which is sent by the first processor is not received when a timing threshold is exceeded, determining that the first processor fails to load the start program from the current storage unit.

5. The method according to claim 1, further comprising:
 determining a processor which adjusts the frequency of a system clock fastest as the first processor with the highest priority.

6. The method according to claim 1, wherein the multi-core processor chip further comprises a Direct Memory Access (DMA) unit and an on-chip storage unit, and the method further comprises:
 when the first processor succeeds in loading the start program and executes the start program to perform the initialization operation, moving, by the DMA unit according to the first priority queue, start programs of other processors whose priorities are lower than that of the first processor to the on-chip storage unit.

7. The method according to claim 1, wherein when the multi-core processor chip adopts a Read Only Memory (ROM) storage unit and a storage unit of a flash channel, the first storage unit of the first processor comprises the ROM storage unit and the storage unit of the flash channel; and
 wherein executing the start program to perform the initialization operation comprises:
 reading, by the first processor, a first part of the start program from the ROM storage unit and executing the first part of the start program, and reading, according to a jump instruction at the end of the first part of the start program, a second part of the start program from the storage unit of the flash channel and executing the second part of the start program.

8. The method according to claim 1, wherein when the multi-core processor chip comprises a Micro Control Unit (MCU), a Central Processor Unit (CPU) and a Digital Signal Processor (DSP), they are ranked in a descending order of priority in the first priority queue as: the MCU, the CPU and the DSP.

9. A multi-core processor chip, comprising at least a boot controller, more than two processors and more than two storage units, wherein the boot controller is communicatively connected with each processor, and the more than two processors are connected in sequence according to a set order of a first priority queue;
 the boot controller is configured to determine a current processor according to the first priority queue of starting the more than two processors, and determine, for the current processor, current storage units from where a start program is to be loaded according to a second priority queue corresponding to the current processor;
 the current processor is configured to load the start program from each current storage unit according to the second priority queue corresponding to the current processor and execute the start program to perform an initialization operation; the current processor is further configured to exit the loading of the start program when the loading of the start program from any one of the more than two storage units succeeds, or the loading of the start program from all of the more than two storage units fails.

10. The method according to claim 9, wherein the multi-core processor chip further comprises a Direct Memory Access (DMA) unit;
 the DMA unit is configured to, when the current processor succeeds in loading the start program and executes the start program to perform the initialization operation, move start programs of other processors whose priorities are lower than that of the current processor to an on-chip storage unit according to the first priority queue.

11. A computer storage medium having stored therein a computer-executable instruction for performing a chip starting method for use in a multi-core processor chip which at least comprises more than two processors and more than two storage units, comprising: setting a first priority queue of starting the more than two processors, and setting a second priority queue of starting each of the more than two storage units for each processor; and further comprising:

determining, according to the first priority queue, a first processor which is to be started and has a highest priority;

successively loading, by the first processor, a start program from each storage unit according to the second priority queue corresponding to the first processor, and executing the start program to perform an initialization operation;

ending the program loading of the first processor when the loading of the start program from any one of the more than two storage units succeeds, or the loading of the start program from all of the more than two storage units fails; and starting the program loading of a second processor until the program loading of the more than two processors is completed.

12. The method according to claim 2, wherein when the multi-core processor chip adopts an ROM storage unit and a storage unit of a flash channel, the first storage unit of the first processor comprises the ROM storage unit and the storage unit of the flash channel; and wherein executing the start program to perform the initialization operation comprises:

reading, by the first processor, a first part of the start program from the ROM storage unit and executing the first part of the start program, and reading, according to a jump instruction at the end of the first part of the start program, a second part of the start program from the storage unit of the flash channel and executing the second part of the start program.

13. The method according to claim 3, wherein when the multi-core processor chip adopts an ROM storage unit and a storage unit of a flash channel, the first storage unit of the first processor comprises the ROM storage unit and the storage unit of the flash channel; and wherein executing the start program to perform the initialization operation comprises:

reading, by the first processor, a first part of the start program from the ROM storage unit and executing the first part of the start program, and reading, according to a jump instruction at the end of the first part of the start program, a second part of the start program from the storage unit of the flash channel and executing the second part of the start program.

14. The method according to claim 4, wherein when the multi-core processor chip adopts an ROM storage unit and a storage unit of a flash channel, the first storage unit of the first processor comprises the ROM storage unit and the storage unit of the flash channel; and wherein executing the start program to perform the initialization operation comprises:

reading, by the first processor, a first part of the start program from the ROM storage unit and executing the first part of the start program, and reading, according to a jump instruction at the end of the first part of the start program, a second part of the start program from the storage unit of the flash channel and executing the second part of the start program.

15. The method according to claim 5, wherein when the multi-core processor chip adopts an ROM storage unit and a storage unit of a flash channel, the first storage unit of the first processor comprises the ROM storage unit and the storage unit of the flash channel; and wherein executing the start program to perform the initialization operation comprises:

reading, by the first processor, a first part of the start program from the ROM storage unit and executing the first part of the start program, and reading, according to a jump instruction at the end of the first part of the start program, a second part of the start program from the storage unit of the flash channel and executing the second part of the start program.

16. The method according to claim 6, wherein when the multi-core processor chip adopts an ROM storage unit and a storage unit of a flash channel, the first storage unit of the first processor comprises the ROM storage unit and the storage unit of the flash channel; and wherein executing the start program to perform the initialization operation comprises:

reading, by the first processor, a first part of the start program from the ROM storage unit and executing the first part of the start program, and reading, according to a jump instruction at the end of the first part of the start program, a second part of the start program from the storage unit of the flash channel and executing the second part of the start program.

17. The method according to claim 2, wherein when the multi-core processor chip comprises an MCU, a CPU and a DSP, they are ranked in a descending order of priority in the first priority queue as: the MCU, the CPU and the DSP.

18. The method according to claim 3, wherein when the multi-core processor chip comprises an MCU, a CPU and a DSP, they are ranked in a descending order of priority in the first priority queue as: the MCU, the CPU and the DSP.

19. The method according to claim 4, wherein when the multi-core processor chip comprises an MCU, a CPU and a DSP, they are ranked in a descending order of priority in the first priority queue as: the MCU, the CPU and the DSP.

20. The method according to claim 5, wherein when the multi-core processor chip comprises an MCU, a CPU and a DSP, they are ranked in a descending order of priority in the first priority queue as: the MCU, the CPU and the DSP.

* * * * *